United States Patent [19]
Finn et al.

[11] Patent Number: 4,678,272
[45] Date of Patent: Jul. 7, 1987

[54] OPTICAL FIBER SPLICE

[75] Inventors: Roger C. Finn, Nepean; Morley S. MacKenzie, Ottawa, both of Canada

[73] Assignee: Northern Telecom Limited, Montreal, Canada

[21] Appl. No.: 347,013

[22] Filed: Feb. 8, 1982

[51] Int. Cl.⁴ .............................................. G02B 6/38
[52] U.S. Cl. .................................................. 350/96.21
[58] Field of Search ..................................... 350/96.21

[56] References Cited
U.S. PATENT DOCUMENTS 4,330,171  5/1982  Malsot et al. ................... 350/96.21
4,345,137  8/1982  Mignien et al. ................. 350/96.21

Primary Examiner—Robert E. Wise
Attorney, Agent, or Firm—Sidney T. Jelly

[57] ABSTRACT

An optical fiber splice comprises two coated fibers, generally of fused silicon, fusion spliced end-to-end. The coating is removed from the ends of the fibers for a short distance prior to fusion. After fusion the uncoated ends and a short length of coated fiber, each side of the fusion joint, are encased in a synthetic resin. Conveniently, the resin is molded about the fibers and is cured by radiation, such as UV light, bright visual light and ion bombardment. The resin may contain reinforcement material.

22 Claims, 12 Drawing Figures

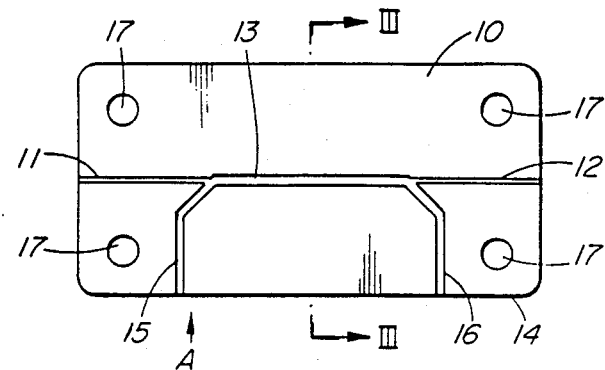
FIG. 1
FIG. 2
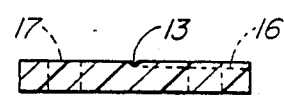
FIG. 3
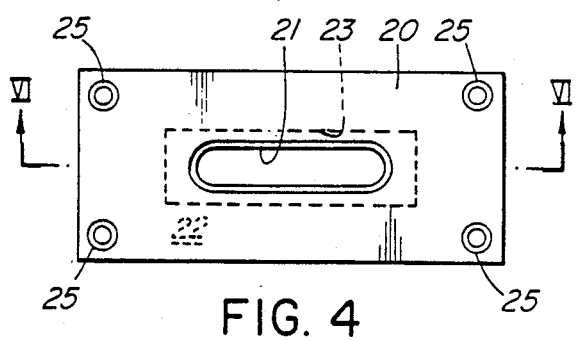
FIG. 4
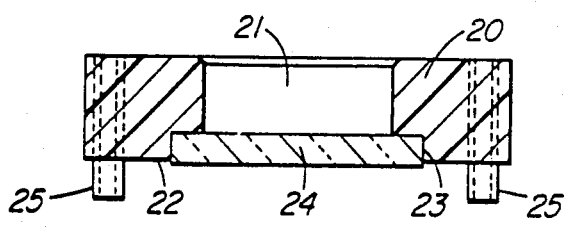
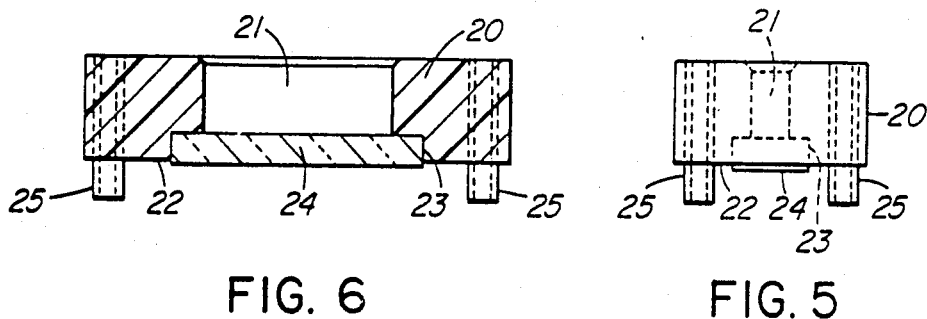
FIG. 6   FIG. 5

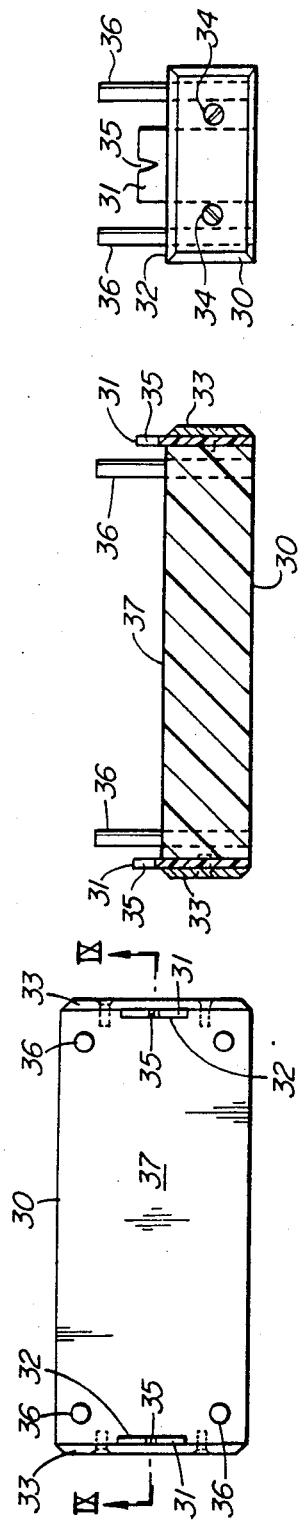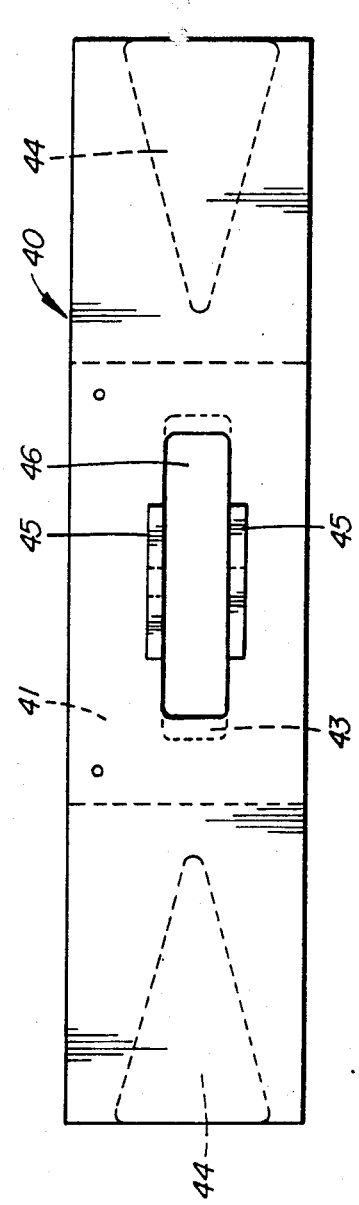

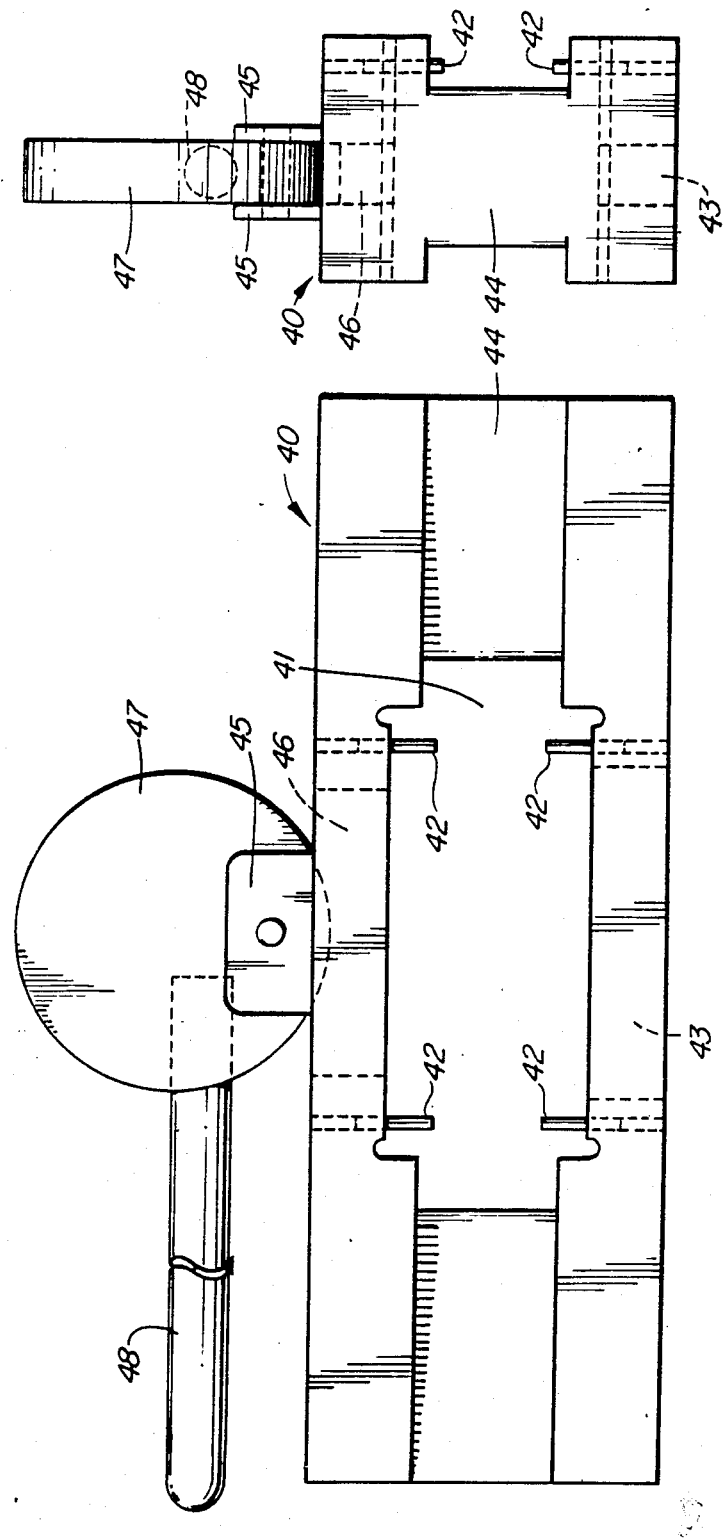

OPTICAL FIBER SPLICE

This invention relates to an optical fiber splice and is particularly applicable to both "factory" splices, which are made in a factory or manufacturing environment, for joining fibers end-to-end prior to assembly into cables, and to splices in the field, for repair of fibers and for splicing fibers after installation, such as in cables.

Splicing is carried out for many reasons, for example; to connect individual fiber lengths into long lengths for making up into cables; to join short lengths of fibers, otherwise too short for commercial use, and thus reduce waste and cost; to repair breaks; to connect fibers to other items, such as electrical and electronic devices.

A typical optical fiber is composed of a core, for example of fused silica, along which propagates a signal, and a cladding layer. A coating layer is added for protection and strengthening of the fiber. In splicing the cores of the fibers are required to be in accurate coaxial alignment. Prior to splicing the coating layer is removed. Removing the coating layer significantly reduces the strength of the so-called "virgin" fiber, sometimes to as low as 20% of the original strength of the virgin fiber. Splicing is often by fusion, the opposed fiber ends being fused together. A further reduction in strength occurs, in the fusion step, down to about 5% of the original strength. Reapplying the conventional coating layer after fusion does not appear to reverse the loss of strength to any marked degree, often no increase occurring at all. It is desirable to raise the strength, after splicing, to at least about 10% of the strength of the "virgin" fiber.

The present invention provides a splice for a pair of optical fibers which are fused end-to-end, the splice being encased in a sheath of synthetic resin, which may incorporate finely divided strengthening material. The coating of each fiber is removed for a short distance from the end of the fiber, prior to fusion. After fusion, the uncovered ends, plus a portion of the coating on each fiber, are encased in the resin material. The encasing can be carried out by molding, or manually by laying the spliced fibers on a layer of the resin, more resin brushed over and then the resin cured. It is a feature of the invention that the resin is one which is cured by irradiation, for example by ion bombardment, ultra violet (UV) light or visible light. Pretreatment of the fiber coating, and the bare fiber itself, with a surface reactant, e.g. a silicone primer, may be provided, for a silicone coated fiber.

The invention will be readily understood by the following description of an embodiment, with modifications thereto, in conjunction with the accompanying drawings, in which:

FIG. 1 is a plan view of one of two molds for encasing a spliced pair of fibers; the two molds identical;

FIG. 2 is a side view in the direction of arrow A;

FIG. 3 is a cross-section on the line III—III of FIG. 1;

FIGS. 4 and 5 are plan and end views respectively of a top pressure member;

FIG. 6 is a cross-section on the line VI—VI of FIG. 4;

FIGS. 7 and 8 are plan and end views respectively of a bottom pressure member;

FIG. 9 is a cross-section on the line IX—IX of FIG. 7;

FIG. 10 is a side view of a pressurizing jig;

FIG. 11 is an end view of the jig of FIG. 10;

FIG. 12 is a top plan view of the jig of FIGS. 10 and 11.

FIGS. 1, 2 and 3 illustrate one of the molds used for encasing a spliced pair of fibers by injection of the reinforced resin. The two molds are identical and conveniently are of silicone, being themselves molded from a master mold. In the face of each mold 10 is a longitudinally extending groove having end portions 11 and 12 and a central portion 13. Extending from one side 14 are two further grooves 15 and 16, the grooves extending to the junctions between the central portion 13 and end portions 11 and 12.

The end portions 11 and 12 are semi-circular in cross-section and of a diameter to be a close fit on a coated portion of a fiber end. The central portion 13 is also of semicircular cross-section and of a somewhat larger diameter than that of the end portions. As an example, end portions 11 and 12 can be 0.010 inches diameter and the central portion 0.025 inches diameter, although these dimensions may vary with different diameters of fiber. Due to the compressability, and flexibility, of the molds, some variation in fiber diameters can be accommodated, with relation to end portions 11 and 12. The maximum diameter of the central portion 13 is dictated by equipment, i.e. cabling, requirements. Each mold also has four location holes 17 positioned towards each corner. The holes differ in each mold, the holes in one mold of slightly smaller diameter than the other mold, as will be explained.

Two molds, as in FIGS. 1, 2 and 3 are held in face to face opposition, the end portions 11 and 12 forming cylindrical bores and center portion 13 forming a cylindrical cavity. The grooves 15 and 16 also form cylindrical, or rectangular, bores, to act as entry and exit gates to the central portion 13. If the molds, as in the present example, are of flexible silicone, then they are supported on top and bottom rigid support plates, typically of metal.

FIGS. 4, 5 and 6 illustrate a top plate 20. The plate 20 is rectangular, generally of the same dimensions as a mold and has a central aperture 21 extending completely through. On a front face 22 a recess 23 is formed, extending around the aperture 21. Positioned in the recess 23 is a fused quartz window 24. Extending from the front face 22 are four locating members 25. The locating members 25 are hollow, and conveniently are formed by drilling holes in the plate 20 and inserting tubes, the tubes being a force fit. The locating members extend a distance equal to the thickness of a mold, and are of a diameter to be a close fit in the location holes 17 in a mold. The mold fitting on the top plate is the one with the larger diameter location holes. The mold is preferably attached to the plate 20 by treating the back surface of a mold with a primer and then coated with a UV cured resin. This gives a fairly weak bond but is sufficient to hold the mold in position.

FIGS. 7, 8 and 9 illustrates a bottom plate 30. The bottom plate is also rectangular and at each end a positioning member 31, for example of neoprene, extends upward. For convenience, the positioning members are separate members, fitting into grooves 32 in the ends of the plate and held in position by end plates 33 held in position by screws 34. The positioning members have Vee grooves 35 extending down from their outer ends. Also extending up from the front face 37 are locating members 36. Locating members 36 are positioned to fit in the bores of the hollow locating members 25 of the top plate. A mold is attached to the front face 32 of the bottom plate, again by treating with a primer and the use of a UV cured resin. The mold attached to the bottom plate has smaller diameter holes 17, to be a close fit over the locating members 36.

In one method of encasing two spliced fibers, the spliced fibers are positioned between two molds, the molds and the top and bottom support plates inserted into a clamping device. One form of clamping device is illustrated in FIGS. 10, 11 and 12. The clamping device, indicated generally at 40, comprises a rectangular block having a central cavity 41 therein. The cavity 41 is dimensioned such that the molds and top and bottom plate can be slid laterally into the aperture 41. Four locating pins 42 extend into the aperture, two from the top and two from the bottom. The pins limit the movement of molds and plates into the cavity and position molds and plates. An aperture 43 is formed in the bottom of the clamping device, extending through to the cavity. The aperture 43 exposed the window 24 in the bottom plate. The portions 44 of the clamping device at each end are tapered inwards, to provide access for the fibers and to prevent sharp bends in the fibers.

Two spaced apart webs 45 extend up from the top surface of the clamping device and a slot 46 extends through the top into the cavity 41, between the webs 45. A cam member 47 is pivotted between the webs 45, the cam having a handle 48. When the molds and plates are in position in the cavity 41, they are pressed together by rotation of the cam member 47, the cam extending down through the slot 46 into contact with the bottom plate. The cam member 47 and handle 48 are omitted from FIG. 12 for clarity.

When the molds and support plates are in position, the resin is injected, by means of a syringe, into one of the grooves 15 or 16. One groove serves as the injection inlet while the other groove acts as a vent. When resin is seen to fill the central portion 13 without bubbles being present in the resin, as observed through the quartz window, then injection is ceased.

After injection, the resin is cured by radiation. Radiation of the resin occurs through the aperture 43, window 24, aperture 21 and through the mold. The radiation can be of variable form. Thus there can be ion bombardment, ultra-violet light or visible light, the resin being selected to suit. As an example an ultra-violet cured resin is one supplied by Summers Laboratory Inc., with the name UV-74 Lensbond Cement, this being a polyester resin, cured by ultra-violet light. The resin may be used "unreinforced" or a reinforcing material can be mixed in, for example mica, carbon, glass. The reinforcing material is usually granular, passing through a 160 sieve, the material having a maximum dimension of about 0.004". However glass fiber in very short lengths has also been used and carbon fibers can also be used. Different strengthening materials appear to be more suitable to certain resins. Thus mica is very good with polyester, carbon with polyacrylate and epoxy resins. The strengthening material and resin combination can be varied to suit the desired results.

Instead of injecting the resin, or mixture of resin and reinforcement, it can be done by hand. Thus the resin, or resin mixture, can be brushed on to a mold, as in FIGS. 1, 2 and 3, the spliced fibers positioned on the mold, more resin brushed on and then the other mold repositioned over. Pressure can be applied and the resin cured by radiation. Alternatively, after positioning the spliced fibers on the brushed on resin, or resin mixture, and brushing on further resin or mixture, the resin can then be cured without pressure. The final splices will not be as uniform or clean as when the resin is injected, but emergency protection and strengthening of a splice can be provided easily.

In the example described, a separate mold and support plate has been provided. The mold can easily be made by molding silicone in a metal master mold member. The silicone does not adhere to the metal and is readily removed. Thus one master mold member can be used to produce numerous silicone molds. The silicone is transparent to the radiation, although the level of transparency may vary. However the mold, item 10 of FIGS. 1, 2 and 3, can be made of other materials, provided the mold, or at least that part encompassing the splice area, is transparent to whatever radiation is used for curing, and it is possible to check for bubbles in the resin in the center portion, as described above.

The resin used, as stated, can vary, and be cured by any convenient form of radiation, the resin selected to suit the radiation, or vice-versa. The reinforcement, if used, can also vary, varying with the resin used and the method by which the resin is applied, i.e. injection or brushing, or other. While a clamping jig has been described, other means of clamping can be used. The material of the molds too can vary with the resin used.

While silicone does not normally adhere to metal, and other materials, it is possible to obtain a bond between silicone and another material by using a silicone primer, for example one supplied by General Electric with the reference number SS4155. The resins are normally at essentially room temperature, although some temperature rise can occur in the resin during curing due to an exothermic reaction.

An example of making a reinforced splice, using the apparatus as described, and illustrated, is as follows. Prior to splicing a pair of optical fibers, the coating is stripped from the end of each fiber, the fibers then being cleaved, in a known manner, leaving a predetermined length of uncoated fiber. The fibers are then positioned in a fusion splicing apparatus, the cleaved ends of the fibers in opposition. The fibers are then fused by an arc. One form of fusion splicing apparatus is described in U.S. Pat. No. 4,274,707.

After fusion, the spliced fibers are positioned on a mold as in FIGS. 1, 2 and 3, and a further mold positioned over the splice. The coated fibers rest in the grooves 11 and 12, while the splice is approximately central in the portion 13. The coating on each fiber extends part way into the portion 13. Prior to positioning of the fibers in the molds, the ends of the coating layers, and the uncoated glass fiber, are coated, as by brushing, with a silicone primer. After closing of the molds, they are positioned in the clamping jig and polyester resin, with strengthening additive, injected into the grooves, for example into groove 15. Air escapes from groove 16 and when bubbles are no longer seen in the center portion 13, injection is stopped. Excess resin emits from groove 16. Radiation is then applied through the aperture 43 and window 24 to cure the resin. Curing time is in accordance with the particular instructions for the resin selected, and the strength of the radiation source.

After curing, the molds, and support plates, are removed from the clamping jig, the molds separated and the encased splice removed. Any flash and the sprews caused by the grooves 15 and 16 are removed.

Some typical results are as follows: The figures are for a fused fiber having a silica diameter, for core and cladding, of 125 microns.

| Reinforcement | Resin | Approx. Load (grams) |
|---|---|---|
| 25% mica | UV-74 polyester | 1432 |
| 35% mica | UV-74 polyester | 1622 |
| 40% mica | UV-74 polyester | 1332 |
| 35% carbon | UV-74 polyester | 400 |
| 30% mica | 044 polyurethene | 984 |
| 40% mica | 044 polyurethene | 837 |
| Nil | UV-74 polyester | 1300 |

A 40% reinforcement in UV-74 polyester applied by hand, that is not injected, as described above, gave a load of 1100 grams. The load is that to cause fracture of the splice, or a fiber within the encasement. The tolerances represent the extreme values within which all the tested samples fell. As stated, another resin is a polyacrylate.

The invention can be used with all of the conventional glass fibers, that is those made from fused silica and those made from other glasses. The invention can also be applied to non-glass fibers. For the values given above, the length of the center portion 13 was 1¼". With a shorter length the strength reduces sharply. The maximum length is determined by the necessity to feed the fiber round bends and any additional strength is usually not necessitated. For a fiber as described above, it is considered that a length of from about 1" to about 1¼" would be the optimum for strength and flexibility requirements.

Examples of other resins which can be used are: polyacrylate by L. D. Caulk Co., which is visible light curable; polyurethane by DeSoto, UV cured; and expoxides by General Electric, which are visible light cured.

What is claimed is:

1. An optical fiber splice joining two optical fibers, each fiber having a plastic coating layer, in an end-to-end relationship, comprising:
    two optical fibers fused end-to-end, the coating layer removed from the end of each fiber for a predetermined distance prior to fusion, and
    a radiation cured synthetic resin extending in a continuous unbroken layer over the uncoated ends of the fibers and over a predetermined length of the coating of each fiber.

2. A splice as claimed in claim 1, said resin incorporating finely divided reinforcing material.

3. A splice as claimed in claim 2, said reinforcing material being of granular form.

4. A splice as claimed in claim 2, said reinforcing material being of short lengths of fiber.

5. A splice as claimed in claim 2, said reinforcing mixture comprising one of mica, carbon and glass.

6. A splice as claimed in claim 1, said resin being an ultra violet light cured resin.

7. A splice as claimed in claim 1, said resin being a visible light cured resin.

8. A splice as claimed in claim 1, said resin being an ion bombardment cured resin.

9. A splice as claimed in claim 1, the resin being a polyester.

10. A splice as claimed in claim 1, the resin being a polyurethane.

11. A splice as claimed in claim 1, the resin being a polyacrylate.

12. A splice as claimed in claim 1, the resin being an epoxide.

13. A splice as claimed in claim 1, the length of the encasement being between about 1" and about 1¼".

14. Apparatus for encasing the fused opposed ends of coated optical fibers comprising:
    two molds, each mold having a face, said faces adapted to the positioned in opposition;
    a groove extending longitudinally across said face of each mold, said grooves in alignment when said faces are in opposition, each groove including a center portion and an end portion at each end of said center portion;
    said grooves, in alignment, defining a cylindrical cavity and a cylindrical bore extending from each end of said cavity, the cylindrical bores of a diameter to be a close fit on said coated fibers, said cylindrical cavity of a larger diameter than said bore;
    grooves in each of said faces, a groove extending from each end of said cavity to a side edge of each of said molds;
    means for holding said molds in opposition, while a radiation curable resin is injected into one of said grooves; and
    at least one of said molds being transparent to the radiation to expose said cylindrical cavity and said cylindrical bores to the radiation.

15. Apparatus as claimed in claim 14, each mold being of a flexible synthetic material, and including two rigid support plates, a support plate for each mold and adapted to support said molds in face-to-face position.

16. Apparatus as claimed in claim 15, including a window in one of said support plates, said window and the related mold being transparent to radiation, for radiation curing of the resin in said cavity and said bores.

17. Apparatus as claimed in claim 16, said molds being of silicone and said window being of fused quartz.

18. A method of splicing two coated optical fibers, end-to-end, comprising:
    removing the coating from an end of each fiber, for a predetermined length;
    fusion splicing said fibers in end-to-end relationship;
    positioning the fused fibers on a bottom mold and positioning a top mold on said bottom mold, said molds having opposed surfaces, said molds each having a longitudinal groove on said opposed surfaces, the grooves being aligned, each groove having a center portion and end portions, said end portions being a close fit on the coated portions of the fibers, said center portion being of an enlarged diameter relative to said end portions;
    clamping said molds together;
    injecting a radiation cured synthetic resin into said center portions of said grooves;
    irradiating the resin through at least one of said molds, the mold being transparent to said irradiation.

19. A method as claimed in claim 18, including mixing a reinforcing material into said resin prior to encasing the fiber ends.

20. A method as claimed in claim 18, said resin a radiation cured resin, including the step of irradiating said resin after encasing the fused of the fibers.

21. A method as claimed in claim 18, including brushing the uncoated ends of the fibers and the predetermined lengths of the coating of each fiber with a primer after fusion and prior to encasing with the resin.

22. A method as claimed in claim 21, the coating being of silicone, the primer being a silicone primer.

* * * * *